United States Patent [19]

Rogers et al.

[11] 3,736,403

[45] May 29, 1973

[54] HANDHELD AUTOMATIC WIRE ELECTRODE TRANSPORT UNIT SUPPLIED WITH POWER FROM A SINGLE RECTIFIER UNIT

[75] Inventors: Laurence B. Rogers, Escondido; Malcolm A. Neumann, El Cajon; Dwain K. Dolan, San Diego, all of Calif.

[73] Assignee: Cubic Corporation, San Diego, Calif.

[22] Filed: Jan. 4, 1971

[21] Appl. No.: 103,393

[52] U.S. Cl. .................... 219/131 F, 219/74, 314/75
[51] Int. Cl. .............................................. B23k 9/10
[58] Field of Search ..................... 219/131, 130, 136, 219/74; 314/73, 75

[56] References Cited

UNITED STATES PATENTS

| | | | |
|---|---|---|---|
| 3,038,990 | 6/1962 | Cotter et al. | 219/130 |
| 3,048,692 | 10/1962 | Bichsel et al. | 219/131 F |
| 3,538,376 | 11/1970 | Parker | 219/131 R |
| 3,013,144 | 12/1961 | Adamson et al. | 219/131 F |
| 3,213,262 | 10/1965 | Marchand | 219/131 F |
| 3,369,146 | 2/1968 | Adamson | 219/131 F |
| 3,049,609 | 10/1962 | Purkhisek et al. | 219/131 F |

Primary Examiner—J. V. Truhe
Assistant Examiner—George A. Montanye
Attorney—Golove, Kleinberg & Morganstern

[57] ABSTRACT

A welding gun and control assembly is adapted to connect alternatively to constant potential or constant current power supplies for an arc welding operation. The gun assembly includes an internal drive motor which automatically advances the electrode wire. The control assembly, which requires only a single cable from the main power supply, provides power to the drive motor and for welding, irrespective of the power supply. In alternative embodiments, the gun and control assemblies can be adapted to operate with a shielding gas, in which case the cable connecting the gun assembly to the control assembly includes a gas hose. The gun assembly is then provided with a shielding gas cowl to enclose the bell portion of the gun.

8 Claims, 3 Drawing Figures

Patented May 29, 1973

INVENTORS.
LAURENCE B. ROGERS
MALCOLM A. NEUMANN
DWAIN K. DOLAN
BY
ATTORNEYS.

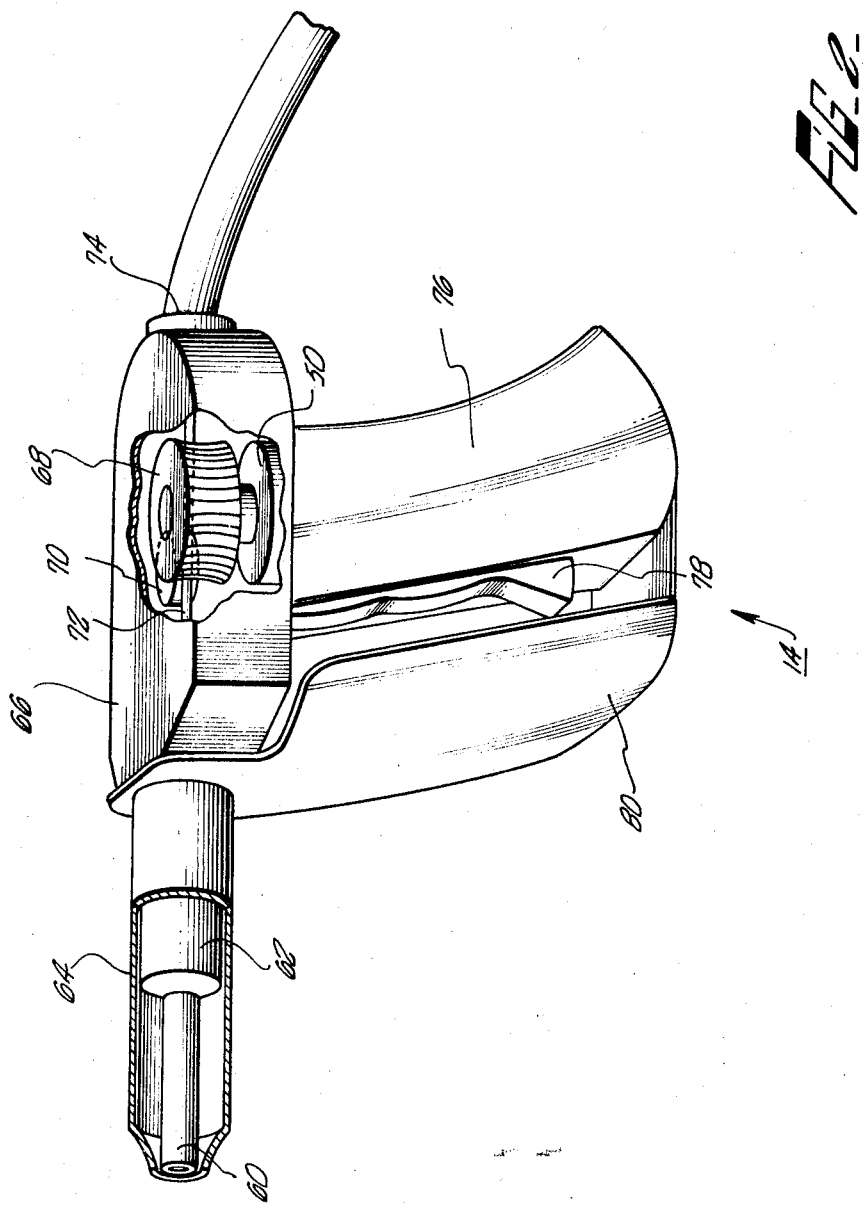

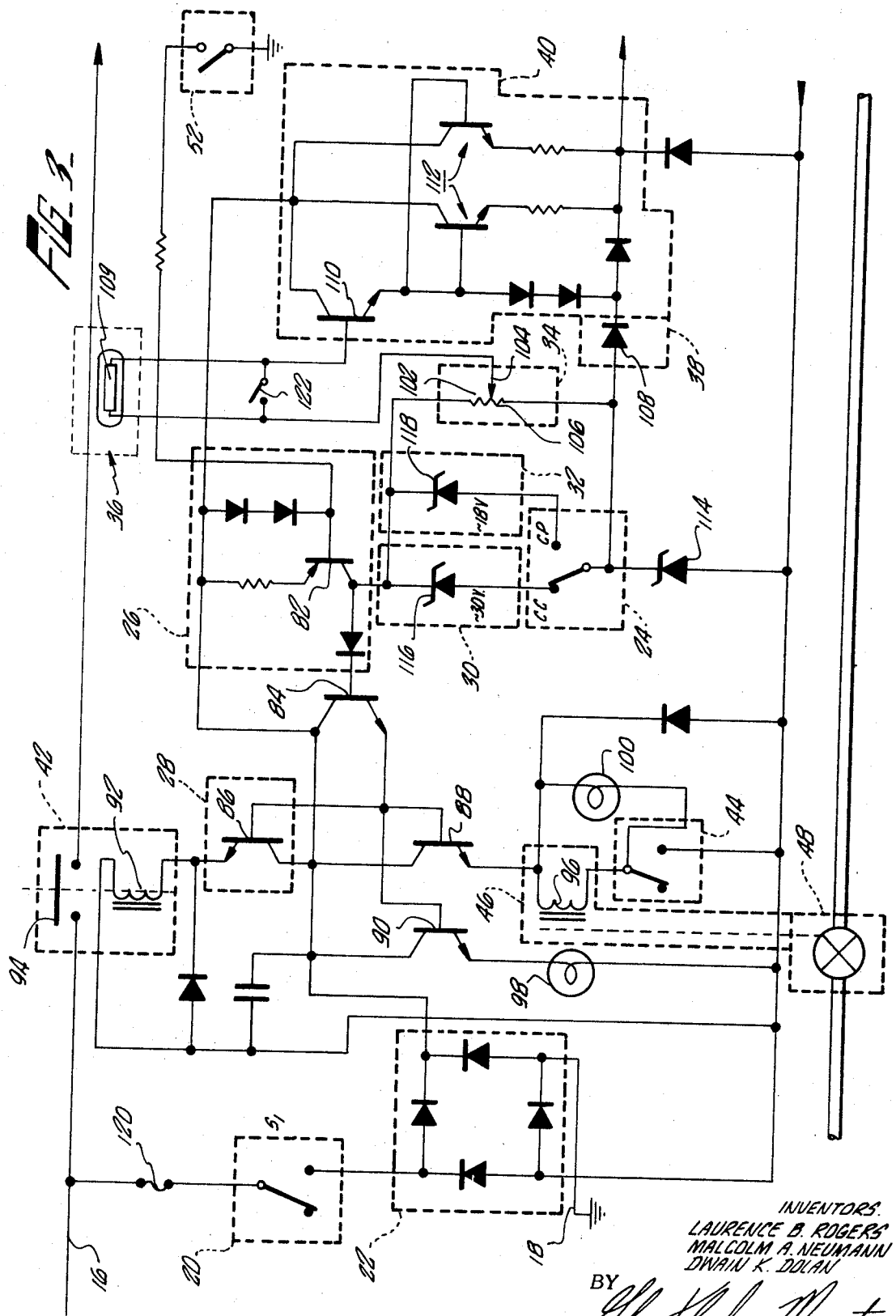

HANDHELD AUTOMATIC WIRE ELECTRODE TRANSPORT UNIT SUPPLIED WITH POWER FROM A SINGLE RECTIFIER UNIT

BACKGROUND OF THE INVENTION

1. Field of the Invention

The present invention relates to electric arc welding apparatus and, more particularly, to a lightweight handheld automatic wire electrode transport unit including a control assembly and a welding gun assembly adapted to be connected to virtually any welding power supply.

2. Description of the Prior Art

In recent years, electric arc welding has become a most important method of joining metals. The use of the arc welder has been virtually universal for fabricating everything from ships to pipes. While the earliest arc welders utilized individual, consumable metal electrodes of limited length, it was soon discovered that efficient production could not be achieved if the weldor frequently had to interrupt his work to replace the electrode.

The prior art quickly developed improved welding equipment which utilized a "continuous" wire electrode that could be supplied on a spool or coil. One manufacturer developed a "push-pull" system in which a wire coil or spool is mounted on a carrier. A wire drive motor in the carrier draws wire from the supply and "pushes" the wire to a hand gun. The hand gun is provided with a feed motor which "pulls" the wire being "pushed" from the supply. The two motors are synchronized to avoid stretching or kinking of the electrode wire.

Other welding guns can be provided without the "pull" motor, relying exclusively upon the "push" motor at the electrode supply. Still other manufacturers provide a portable reel of electrode wire and rely exclusively upon a "pull" motor in the hand gun.

Most of the prior art welders with automatic electrode feed are designed to operate with the power supplies which are provided by the manufacturer. The power supplies provide the high-current power required for welding. Generally, the power supplies are either "constant current" (CC) or "constant potential" (CP). The welding power supply is adapted to plug into a source of industrial power which may be ac or dc, or if at remote locations, motor-generator sets can be employed.

In some industrial environments, heavy-duty, high-production fabrication takes place, requiring large numbers of weldors who, in turn, must be highly mobile. Typically, shipyards and heavy equipment fabricators of all kinds have equipped themselves with large, self-contained power sources. These have included motor-generator sets as well as extremely high-power substations from public utility transmission power networks.

In many installations, an infinite current source was provided with current limiting resistors in a power "grid." Numerous weldors, each with a "stick" electrode welding "gun," could then "plug-in" to the grid, avoiding the need for numerous, individual welding power supplies, which would otherwise have to be distributed throughout the work area.

Such grid systems, which appear to be most like constant current supplies, operate at approximately 80 volts potential, which render them incompatible with the prior art, continuous wire welders, since the maximum operating voltage of those devices tends to be substantially less than the voltage generally available on the grid. For example, the U.S. Pat. to R.E. Purkhiser, et al. No. 3,049,609, issued Aug. 14, 1962, showed a drive motor circuit operable with a 70-volt supply. The drive motor is shunted by the welding arc with overvoltage protection circuits including a zener diode across the drive motor.

SUMMARY OF THE INVENTION

It has been determined that a desirable compromise would provide a welding gun and control assembly which is utilizable with constant current, constant voltage, or power grid sources, and both with and without inert shielding gas. Preferably, the control assembly should be connected to a main power source with a two-wire cable for mobility. The coupling between the control assembly and the gun assembly includes a cable having a trigger switch line, a motor drive line, and a main arc power line. Also included in the cable can be the electrode feed and, in order to accommodate a shielding gas, a gas line.

In a preferred embodiment according to the present invention, a control assembly includes appropriate current and voltage overload protecting circuits, appropriate low-voltage control circuits for the electrode drive motor, and circuits which allow the motor to be controlled whether in the constant current or constant-potential operating mode.

An improved "welding" gun is disclosed which includes a low-voltage drive motor, positioned in the handle thereof, and includes an appropriate drive gear and idler roller with provision for adjusting the holding pressure upon the electrode against the main drive gear.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a side perspective view, partly in phantom of a welding gun assembly according to the present invention; and FIG. 3 is a circuit diagram of the control assembly of FIG. 1.

DESCRIPTION OF THE PREFERRED EMBODIMENT

Figure 1:
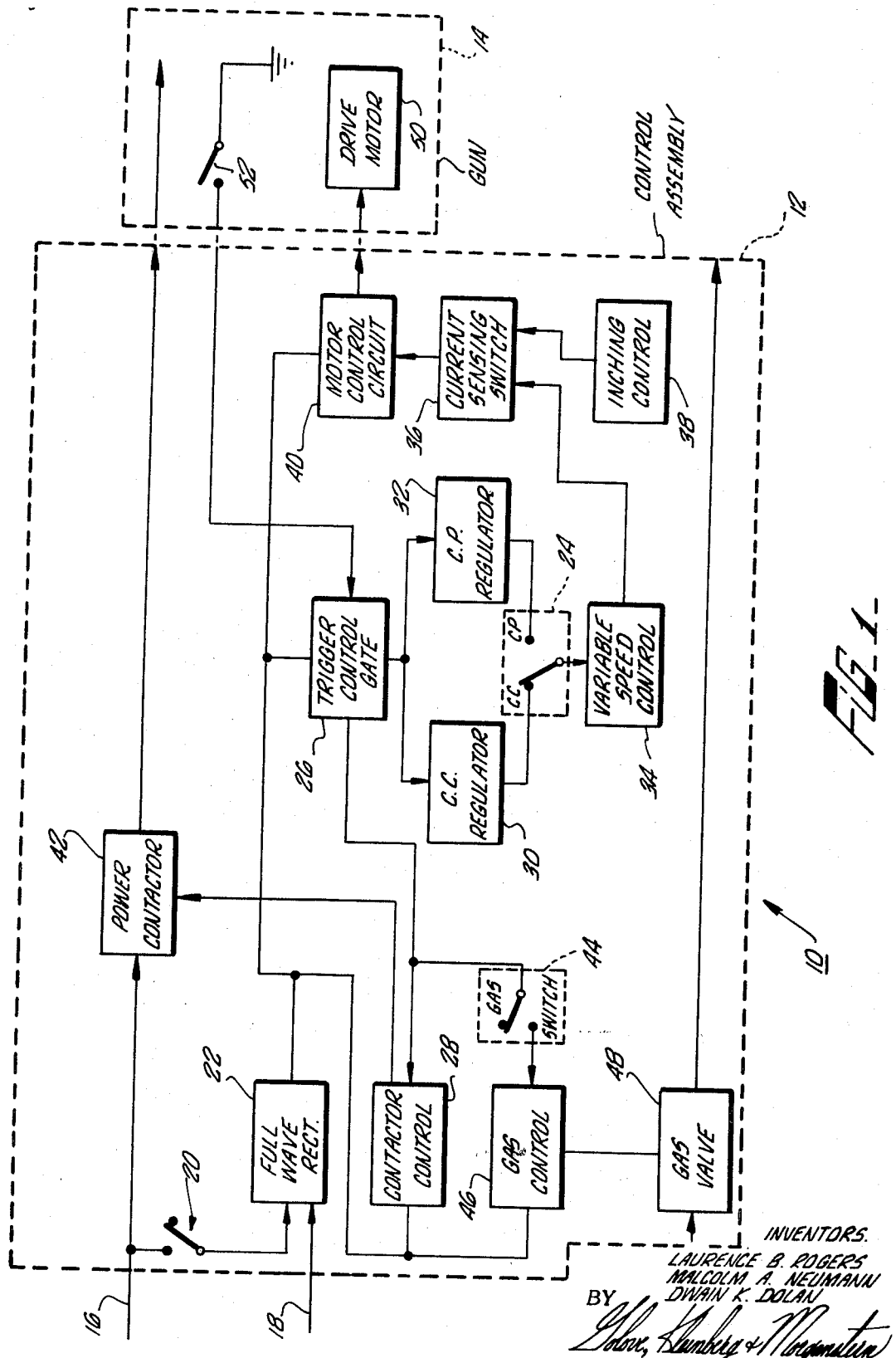
FIG. 1 is a block diagram of a control assembly according to the present invention.

Turning first to FIG. 1, there is shown, in block form, arc welding apparatus 10 according to the present invention. As a first block, there is shown the elements of a control assembly 12, and as in a separate block, there is shown elements of the welding gun 14.

The control assembly 12 is adapted to be connected to the main power source with a first cable 16, and a second cable 18 is coupled to a main power common source. A main power switch 20 couples the main power line 16 to provide power to the several elements of the control assembly 12.

A full wave rectifier unit 22, as shown, supplies a positive voltage potential to the circuits comprising the elements of the control assembly 12. It is noted that the common connection to the several elements has been omitted, but it will be understood by those skilled in the art that such a connection is required.

A mode switch 24 is set alternatively to a constant current (CC) setting or a constant potential (CP) setting, depending upon the source of main power. A trigger control gate 26 applies the energizing potential to a contactor control circuit 28 and, depending upon the setting of mode switch 24, to either a constant current regulator 30 or a constant potential regulator 32.

The output of the selected regulator is applied through a variable speed control circuit 34 to a current sensing switch 36. An inching control circuit 38 is also connected to the current sensing switch 36 to energize the motor control circuit 40. The contactor control circuit 28 applies an energizing signal to a power contactor 42 that ultimately applies welding power to the welding gun circuits 14.

A gas control switch 44 is provided so that the system can utilize a shielding gas. The trigger control gate 26, when closed and with the switch 44 in the appropriate configuration, applies an energizing potential to a gas control circuit 46 which operates a gas valve 48 in the shielding gas system.

Within the gun 14 there is a drive motor 50 which pulls the wire electrode from a supply reel (not shown). A trigger switch 52 permits manual operation of the entire system.

In operation, the main power switch 20 is closed to apply the main power to the full wave rectifier 22. This supplies an activating potential to all of the circuits of the system 10.

Assuming that a shielding gas will not be used, the gas switch 44 is placed in the "off" configuration. In the present example, the main power source is a constant potential (CP) source, and accordingly, the mode switch 24 is placed in the "CP" configuration. The variable speed control 34 is initially set to a desired electrode feed rate by the adjusting of a suitably calibrated control knob (not shown).

When the operator is ready to commence work, the trigger switch 52 is closed. The trigger control gate 26 is then energized, and the inching control circuit 38 applies a low voltage to the motor control circuit 40. The drive motor 50 is then slowly operated, so that the electrode can be drawn from the supply.

The contactor control 28 is also energized to operate the power contractor 42, which enables the provision of main power to the electrode. As the electrode contacts the work, an arc is struck. The flow of current resulting from the establishment of the arc is detected by the current sensing switch 36 which then closes. Closure of the current sensing switch 36 effectively disables the inching control 38 and applies power to the motor control circuit 40 directly from the variable speed control circuit 34. In one embodiment, the CP regulator holds the voltage that is supplied to the drive motor at approximately +18 volts.

The welding gun then operates in a conventional, constant potential operation until the trigger switch 52 is released, disabling the trigger control gate 26. The power contactor 42 is released, and the drive motor 50 is de-energized.

Alternatively, if it is desired to operate the system in the constant current (CC) mode, the switch 24 is set appropriately, and the trigger switch 52 is closed. As before, the inching control circuit 38 operates the drive motor 50, and the power contactor 42 closes, thereby providing welding current to the electrode.

An arc is struck, and the current sensing switch 36 operates. In this configuration, a speed regulating feedback is utilized since the CC regulator 30 maintains a higher voltage. As the arc current decreases, indicating that the electrode is being consumed faster than it is being provided, the arc voltage tends to increase. This increase in voltage also appears in the CC regulator 30 and is fed back to the motor. Increased voltage to the motor increases the rate at which the electrode is provided, thereby shortening the arc. The arc current then increases, and the arc voltage decreases. As is shown, for example, in Purkhiser, et al., supra, the drive motor 50 will be servoed by the arc voltage as it fluctuates.

Turning next to FIG. 2, there is shown a welding gun assembly 14 according to the present invention. The gun 14 includes a main barrel assembly 60 through which a welding electrode passes. The arc voltage is applied to the electrode through an appropriate contact element in the center of the barrel assembly 60 (not shown).

An insulator barrel 62 electrically isolates the barrel assembly 60 from the operator and supports a shielding gas barrel 64 through which shielding gas can be applied to the work area. As shown, there is a concentric opening between the barrel assembly 60 and the shielding gas barrel 64 through which shielding gas can be applied in the area of the weld.

The several barrels are fastened to a main housing assembly 66, which contains a drive gear 68 and an idler gear 70, between which the continuous electrode wire 72 is propelled. The housing assembly 66 also contains the connection to a cable assembly 74, which may hold the gas supply, the power input, and the wire electrode. A handle assembly 76 connects to the main housing assembly 66 and includes a trigger 78, a hand guard 80, and the drive motor 50.

The main drive gear 68 is, in this embodiment, coupled through a gear box (not shown) to the motor output shaft. The drive gear 68 is slightly concave to increase the contact area on the electrode 72. The concavity acts as a self-aligning feature, tending to keep the wire electrode 72 centered with respect to the drive gear 68.

The integral gear box (not shown) of the motor 50 is preferably of the planetary type, having a substantial gear ratio. In one embodiment, a planetary-type gear box was provided with a gear ratio of 121.1 to 1. The motor 50 was capable of linear operation from 3,000 rpm to 18,000 rpm and, with the gear box unit, was capable of furnishing electrode speeds of from 60 to 420 inches per minute.

Manual operation of the trigger 78 operates the trigger switch 52 of FIG. 1 which, as described above, causes a low, inching voltage to be applied to the motor. The main drive gear is caused to rotate, driving the wire electrode 72 through the center of the barrel assembly 60. Welding power is applied to the electrode 72. If shielding gas is utilized, such gas is applied in the area between the shielding gas barrel 64 and the main barrel 60.

As the arc is struck between the electrode 72 and the workpiece, the flow of current is sensed and the voltage to the motor 50 is raised to increase the feed rate of the electrode 72. The hand guard assembly 80 serves to protect the hand of the operator during welding.

Turning next to FIG. 3, there is shown a typical circuit which mechanizes the blocks of FIG. 1. Accordingly, the various blocks are indicated by dashed lines, and the reference numerals of FIG. 1 are applied to the corresponding dashed boxes.

As shown, the trigger control gate 26 includes a trigger control transistor 82 which is connected to be energized by the closure of the trigger switch 52. The output of the trigger control transistor 82 is applied to a first control transistor 84 whose output energizes a contactor control transistor 86, a gas control transistor 88, and a lamp driver 90. The contactor control transistor 86 energizes a solenoid 92, which operates a switch 94 in the power contactor assembly 42.

If the gas switch 44 is in the appropriate configuration, energization of the gas control transistor 88 similarly energizes a gas control solenoid 96, which operates the gas valve 48. The lamp driver transistor 90 operates a single lamp 98 to provide a visible indication that the trigger has been operated and that the power contactor 42 has closed to apply welding power to the electrode.

A second lamp 100 is placed in the gas control circuit 46 to provide a visual indication that the gas valve 48 has been opened and that shielding gas is being applied to the gun.

The trigger control transistor 82 also applies an energizing voltage through a potentiometer 102 comprising the variable speed control 34. It may be seen that the output of the variable speed control 34 is the wiper contact 104 of the potentiometer and that the entire potentiometer resistance element 106 is connected through a diode assembly 108 to apply the low, inching voltage to the drive motor 50.

When the wire electrode makes contact and an arc is struck, an inductive coupling to the welding power line generates a magnetic field closing the magnetic reed switch comprising the current sensing switch 36. A voltage signal from the potentiometer wiper arm 104 is then applied through the current sensing switch 36 to a first motor control transistor 110, which, as shown, is connected in an emitter-follower configuration to drive a matched pair of current amplifying transistors 112, whose output is applied to the drive motor 50. A motor protecting zener diode 114 is connected in parallel with the drive motor 50 to protect against over-voltage situations.

The CC regulator 30 may be simply a CC zener diode 116 selected to provide a constant voltage, which in one embodiment was set to be 30 volts. Similarly, in a parallel branch, a CP zener diode 118 is selected to maintain the voltage at approximately 18 volts. The mode select switch 24 alternatively connects the motor driving circuit to one of the two regulator circuits. In other embodiments, the CC zener diode 118 may be continuously connected, and the CP zener is connected in parallel when constant potential operation is desired.

It will be seen that the circuits of FIG. 3 will provide the operation discussed above in connection with FIG. 1. Moreover, a protecting fuse 120 is included in series with the main power switch 20 to protect the control assembly 10 from power overloads, and the motor protecting zener 114 can accommodate any voltage surges that may be encountered.

If, for any reason, the welding current should drop significantly, the current sensing switch 36 will open, disabling the motor control circuit 40. The trigger switch 52 remaining closed, the drive motor 50 will then slowly supply welding electrode until the trigger switch 52 is released. Releasing the trigger switch 52 disables the trigger control gate 26, which, in turn, de-energizes the power contactor solenoid 92 and the gas control solenoid 96. The welding power is then removed from the electrode, and the various signal lamps 98, 100 are extinguished. Should a higher feed rate be desired at the outset, a second, manually operated switch can be included in parallel with the current sensing switch 36 to apply full motor power whenever the trigger is operated.

The control assembly 10 can operate from applied dc power ranging from 20 to 110 volts, substantially independent of the applied polarity. The full wave rectifier 22 is arranged so that the control assembly circuits are applied with potential of the proper polarity. Similarly, the system can also accommodate ac power of up to 50 volts (rms) since that power, too, is applied to the full wave rectifier 22.

Constant potential, constant current, or grid power supply systems can be utilized, and a mode selection switch is provided to select operation with the particular power supply chosen. A variable speed control permits the preselection of the electrode feed rate, and in the constant current mode, the variations in the voltage while welding will affect the speed of the drive motor. These circuits are arranged to maintain the electrode feed rate at a value that assures a good weld.

Thus, there has been shown a portable, handheld, automatic wire electrode transport unit and a control assembly that connects with a single conducting pair to any available power source. The control assembly utilizes the welding power supply as the control power supply to operate the various elements within the control assembly without the need for a connection to separate sources of intermediate or low-power electrical energy.

A welding gun may be connected to the control assembly by a multi-element interconnecting cable of a relatively short length which would include the welding power supply, the motor power supply, the trigger switch contacts, and a shielding gas supply. However, this complex cable is of limited length and, therefore, does not impose any substantial impediment to mobility of the weldor. In some embodiments, the welding power to the control assembly may be applied through a single conductor if a local ground connection is made available.

Circuits other than those specifically described may be employed within the scope of the present invention. Accordingly, the invention should only be limited by the scope of the claims appended hereto.

What is claimed as new is:
1. A welding system comprising:
   a. a welding gun for holding an electrode adapted to be hand held and having a trigger switch and an integral electrode feed motor;

b. a single rectifier coupled to a single source of welding power for providing all electrical operating power;
c. electronic power means coupled to said rectifier and responsive to said trigger switch for controlling the provisions of electrical voltage and current from said rectifier;
d. feed motor control means coupled to said electronic power means and said feed motor for selectively and incrementally applying energizing electrical power to energize said feed motor;
e. welding current sensing switch means responsive to the flow of welding power current for independently energizing said feed motor control means; and
f. inching circuit means for incrementally energizing said control means from said electronic power means for applying electrical power at a greatly reduced level to said feed motor.

2. The system of claim 1 further including voltage regulating means connected to said electronic powering means for controlling the selected magnitude of the voltage being applied to said feed motor control means.

3. The system of claim 2, in which said voltage regulating means include a first voltage regulating circuit for providing a voltage approximating the drive motor maximum drive voltage, a second voltage regulating circuit for providing a voltage substantially less than the drive motor maximum voltage and a switch coupled to one of said voltage regulating circuits for selectively including said one circuit.

4. The system of claim 1 including constant current and constant voltage regulating means alternatively selectable for limiting the magnitude of the voltage being applied to said feed motor control means, and switch means for selecting one of said first and second voltage regulating means whereby a selection of either a constant current or constant potential source is obtained.

5. The system of claim 1 wherein said feed motor control means include:
a. potentiometer means having a resistive element and first and second ends connected to be powered by said electronic powering means and a wiper contact adapted to contact said resistive element intermediate said first and second ends;
b. means coupling said wiper contact to said current sensing switch means; and
c. wherein said inching circuit means serially include said potentiometer means resistive element.

6. The system of claim 1, wherein said feed motor control means include amplifier means having an input coupled through said current sensing switch means and an output coupled to feed motor.

7. The system of claim 1, including a shielding gas control means comprising a gas valve driver circuit electrically coupled to said electronic powering means; a gas valve adapted to be operated by said gas valve driver circuit; and signalling means coupled to said gas valve driver circuit for providing a visual indication of gas valve energization.

8. The system of claim 1 in which a control circuit is connected to said source of welding power and is operable in response to the provision of electrical power from said electronic power means, and an electrode is connected to the output of said control circuit, whereby welding power is applied to said electrode only after said trigger switch has been actuated.

* * * * *